March 1, 1949.  O. W. HOGREFE  2,463,176
SUPPORT FOR CLOTHESLINE REELS
Filed July 17, 1946  2 Sheets-Sheet 1
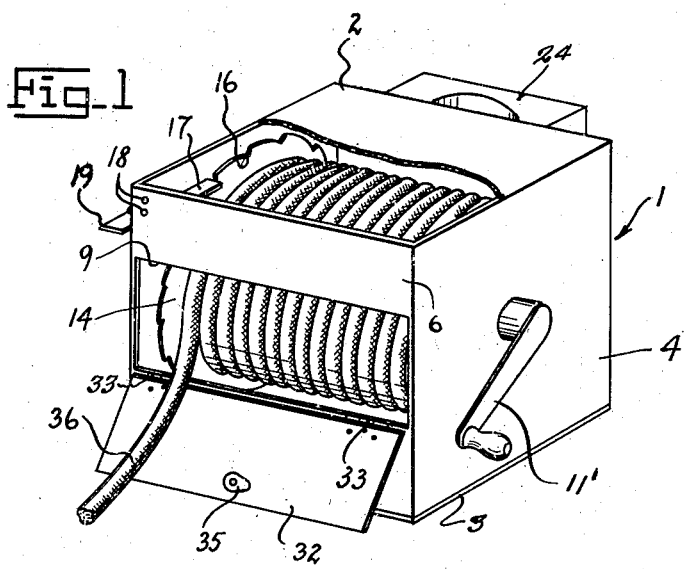
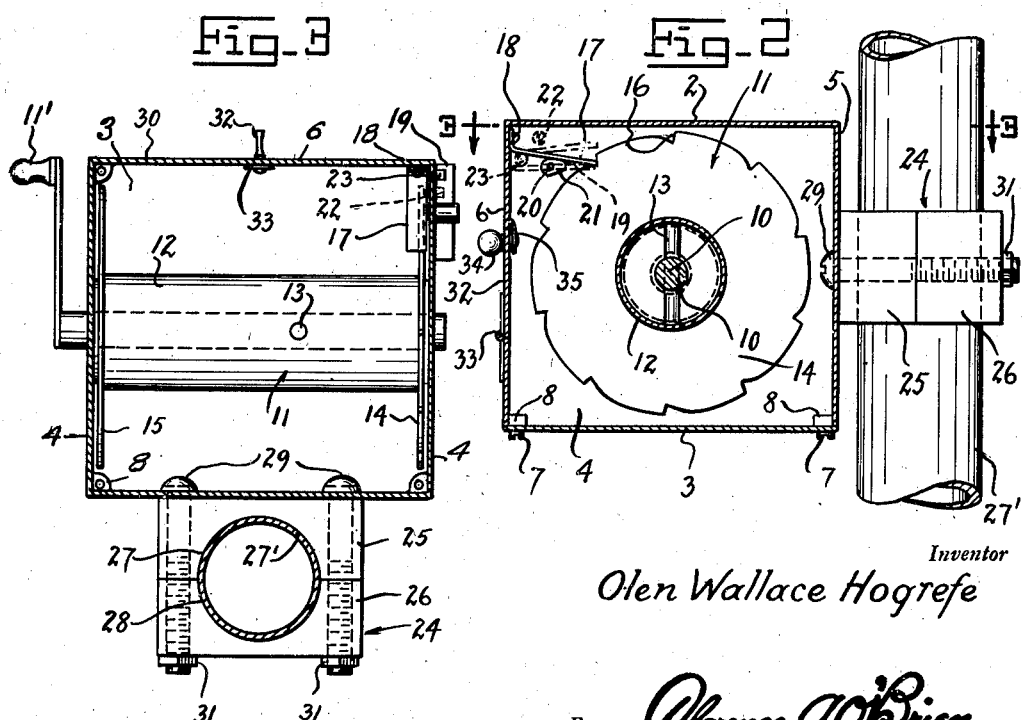
Inventor
Olen Wallace Hogrefe March 1, 1949. O. W. HOGREFE 2,463,176
SUPPORT FOR CLOTHESLINE REELS
Filed July 17, 1946 2 Sheets-Sheet 2

Inventor
Olen Wallace Hogrefe

By Clarence A. O'Brien
and Harvey B. Jacobson
Attorneys

Patented Mar. 1, 1949

2,463,176

UNITED STATES PATENT OFFICE 2,463,176

SUPPORT FOR CLOTHESLINE REELS

Olen Wallace Hogrefe, Omaha, Nebr.

Application July 17, 1946, Serial No. 684,363

1 Claim. (Cl. 248—230)

My invention relates to improvements in reels for clothes lines, especially, although not necessarily, the primary object in view being to provide a simply constructed reel of few parts, inexpensive to manufacture, and which is adapted to be clamped to a post and for easy operation to wind up or unwind a clothes line, as desired, the wound line being so protected from the weather that the same may be left outdoors continuously without damage to the line impairing its usefulness, and resulting from exposure to rain, sleet and snow.

Other and subordinate objects, also comprehended by my invention, together with the precise nature of my improvements, and the advantages thereof, will be readily understood when the succeeding description and claim are read with reference to the drawings accompanying and forming part of this specification.

In said drawings:

Figure 1 is a view in perspective, partly broken away and shown in section, and illustrating my improved reel, in a preferred embodiment thereof with the closure flap open.

Figure 2 is a view in vertical transverse section,

Figure 3 is a view in horizontal section taken on the line 3—3 of Figure 2,

Figure 4:
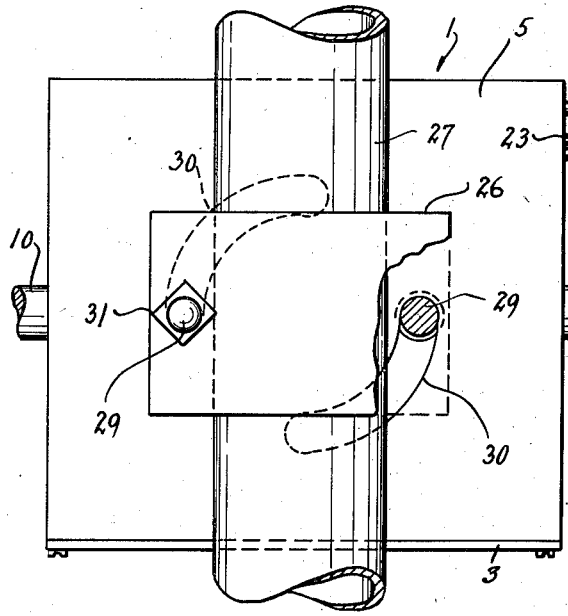
Figure 4 is a view in rear elevation drawn to an enlarged scale and with parts shown in section.
Figure 6:
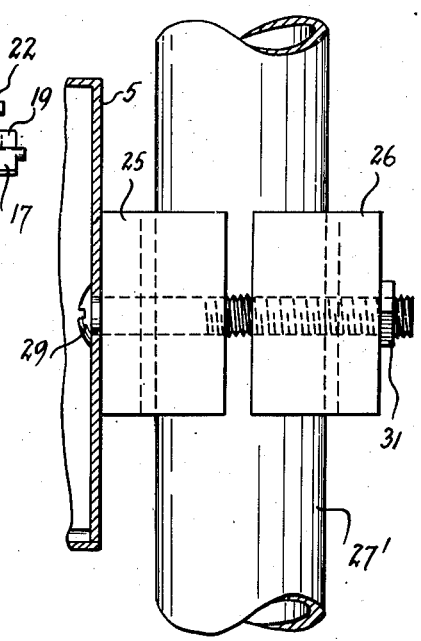
Figure 6 is a fragmentary view in vertical section illustrating the manner in which the clamp is tightened.

Reference being had to the drawings by numerals, according to my invention, as shown, the housing 1 is provided preferably of sheet metal, and rectangular box-like form, and which embodies a top 2, a bottom 3, sides 4, a back 5, and a front 6. The bottom 3 is detachable for access to the interior of the housing and is secured to the sides 4 by means of screws 7 turned into lugs 8 on said sides. A central, reduced opening 9 extends across the front 6 from side to side of the housing 1.

The reel shaft 10 extends through the sides 4 of the housing 1 and is suitably journaled in said sides in the center thereof with a hand crank 11' fast on one end thereof.

A reel 11 is enclosed by the housing 1 and comprises a cylindrical hollow core 12 relatively larger in diameter than the reel shaft 10 with ends fitting between the sides 4 and sleeved onto the reel shaft 10. A pin 13 extends diametrically through the core 12 and reel shaft 10 and secures said core to said shaft. The core 12 of the reel 11 has suitably formed thereon adjacent the ends thereof a pair of side flanges 14, 15, the flange 14 being formed with ratchet teeth 16 thereon.

A leaf spring pawl 17 is fixed at one end, as at 18, on the front 6 of the housing 1 to dog rotation of the reel 11, counter-clockwise as viewed in Figures 1 and 2, said pawl ratcheting over the teeth 16 upon rotation of the reel 11 clockwise.

A pawl release bar 19 is pivoted, as at 20, on one side 4 of the housing 1, on the outside of the housing, with a cam 21 on the pivot 20 thereof underlying the pawl 17 the arrangement being such that said bar 19 may be rocked in opposite directions to lift the pawl 17 into disengaged position, or, to permit said pawl to engage the ratchet 16. A pair of stop pins 22, 23 limit rocking of said bar 19 in opposite directions.

A clamp 24 is provided on the back 5 of the housing 1 comprising a pair of clamping blocks 25, 26 with concave mating faces 27, 28 and which are adapted when the clamp is tightened to fit around and clampingly engage a post 27'. A pair of bolts 29 extend through a pair of arcuate slots 30 in the back 5 and through said blocks 25, 26, said bolts 29 being provided with nuts 31 by means of which the blocks 25, 26 may be drawn into tight clamping relation and secured in fixed position to the back 5 of the housing 1.

A downwardly and forwardly opening closure flap 32 is hinged, as at 33, to the front 6 of the housing 1 to close the opening 9. A suitable knob 34 is rotatably mounted on the closure flap 32 with a rotatable catch 35 thereon for engagement behind the front 6 to retain said flap 32 in closing position.

Figure 5:
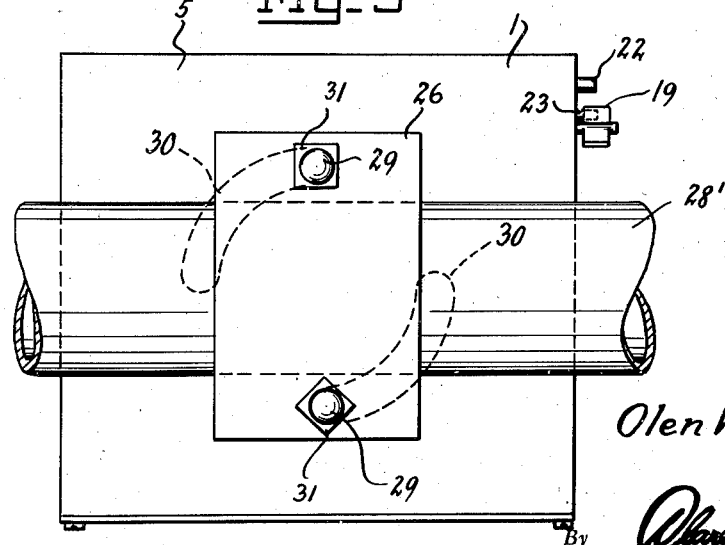
Figure 5 is a similar view illustrating an optional manner of attaching the reel.

As will be obvious, a clothes line 36, secured to the reel 11 in any suitable manner, and extended therefrom out of the opening 9 may be wound up by rotation of the reel in the proper direction, clockwise, as viewed in Figures 1 and 2, to tighten said line with its free end attached to a fixed post or the like, not shown. Conversely, the line 36 may be unwound by rotation of the reel 11 counter-clockwise, as viewed in Figures 1 and 2. The pawl 17 and ratchet teeth 16 normally prevent rotation of the reel 11 in a direction to unwind the line 34 but may be quickly released by rocking of the bar 19 in the proper direction to release or disengage the pawl 17, so that the reel 11 may be rotated to unwind said line. When the line 36 is completely wound up, the closure flap 32 may be closed and latched, in a manner which will be clear, to completely house the line 36 on the reel 11. By means of the bolts 29 and arcuate slots 30, the clamp 24 may be rotated so as to be clamped to a vertical post 27' and hold the housing 1 in a position such that the reel 11 operates about a horizontal axis. Also, by rotating the clamp 24, in the manner described, said clamp may be positioned for attachment to a horizontal post 28', as shown in Figure 5, to secure the housing 1 to said bar with the axis of the reel 11 horizontal. As will be manifest, the clamp 24 may be rotated into a number of different positions to secure the housing 1 to a post inclining either from the vertical or horizontal, to always maintain the axis of the reel 11 horizontal regardless of the fact that the post 27' or post 28' may be inclined from correct position.

The foregoing will, it is believed, suffice to impart a clear understanding of my invention, without further explanation.

Manifestly, the invention, as described is susceptible of modification without departing from the inventive concept, and right is herein reserved to such modifications as fall within the scope of the appended claims.

What I claim is:

Attaching means for securing a clothesline reel to a pole comprising a casing adapted to house the reel journalled therein, and having a back plate, a pair of complemental clamping blocks opposed to said plate and movable into clamping relation whereby the same are adapted to grip the pole therebetween, and a pair of clamping bolts slidably extending through said blocks upon opposite sides of the pole and through said plate for moving said blocks into clamping relation and said plate into clamping relation to one of the blocks, said plate having a pair of arcuate slots therein for rotating said plate on said bolts through an angle of 90 degrees to correspondingly rotate said casing and position the reel crosswise of or parallel to said pole selectively.

OLEN WALLACE HOGREFE.

REFERENCES CITED

The following references are of record in the file of this patent:

UNITED STATES PATENTS

| Number | Name | Date |
| --- | --- | --- |
| 179,650 | Eaton | July 11, 1876 |
| 419,427 | Eichnex | Jan. 14, 1890 |
| 456,157 | Ormsby | July 21, 1891 |
| 625,032 | Homan | May 16, 1899 |
| 1,303,249 | Brown | May 13, 1919 |
| 1,384,520 | Ditson | July 12, 1921 |
| 1,453,157 | Miessner | Apr. 24, 1923 |